Feb. 1, 1927.
W. J. BUELL
CABLE THREADING APPARATUS
Filed Oct. 11, 1926
1,616,410
5 Sheets-Sheet 2
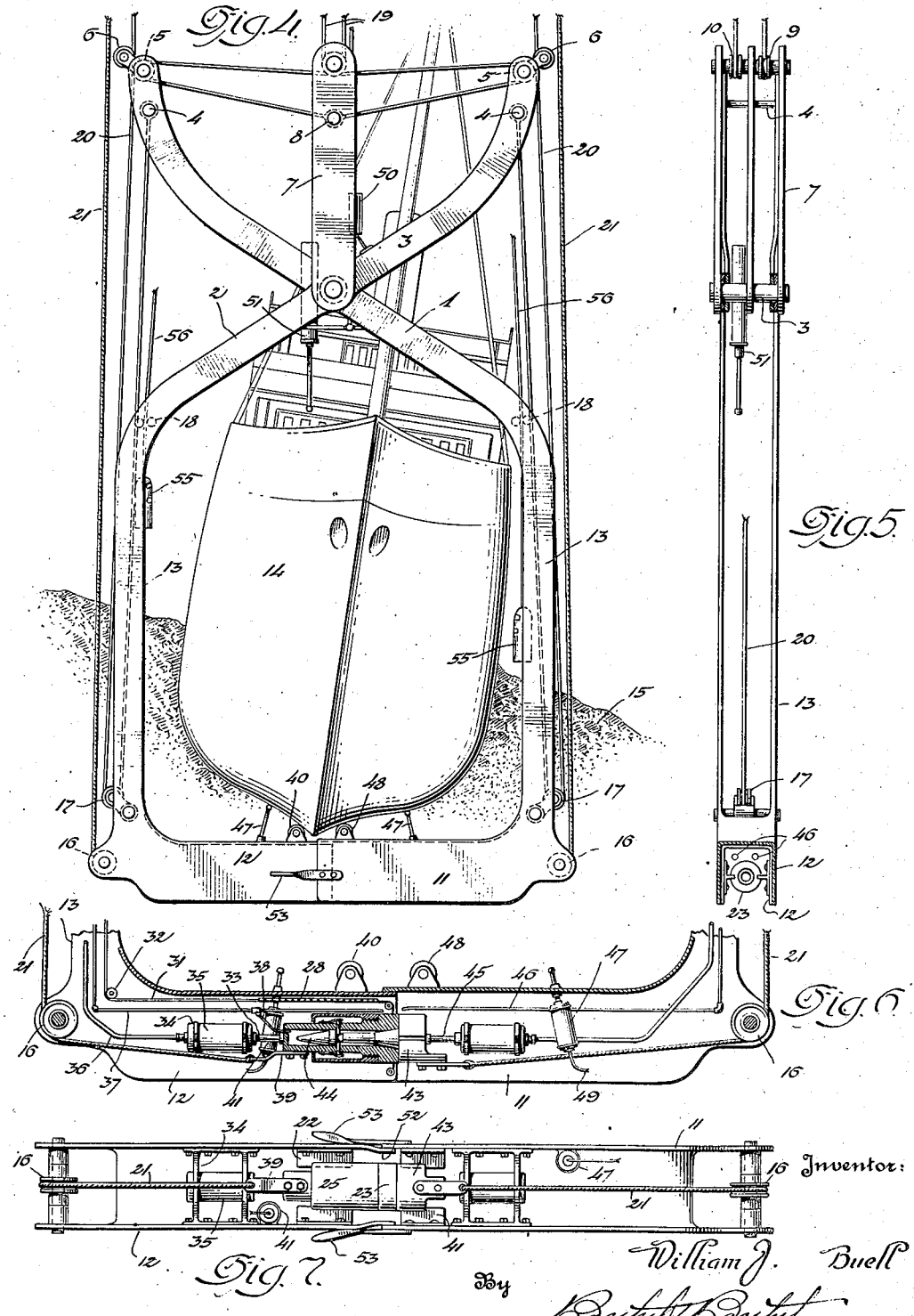
Inventor:
William J. Buell
By
Attorneys.

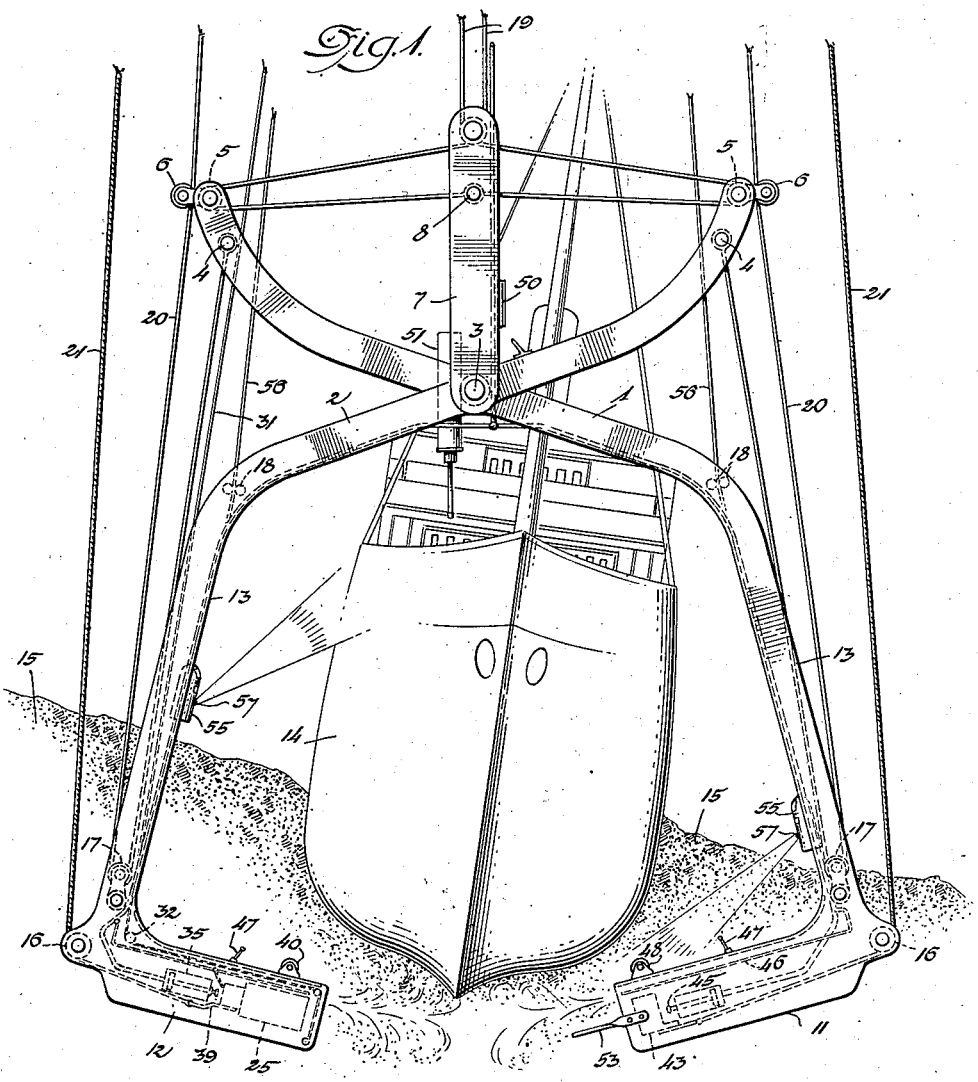

Feb. 1, 1927.

W. J. BUELL 1,616,410

CABLE THREADING APPARATUS

Filed Oct. 11, 1926    5 Sheets-Sheet 4

Inventor:
William J. Buell
By
Attorneys.

Feb. 1, 1927.
W. J. BUELL
1,616,410
CABLE THREADING APPARATUS
Filed Oct. 11, 1926   5 Sheets-Sheet 5
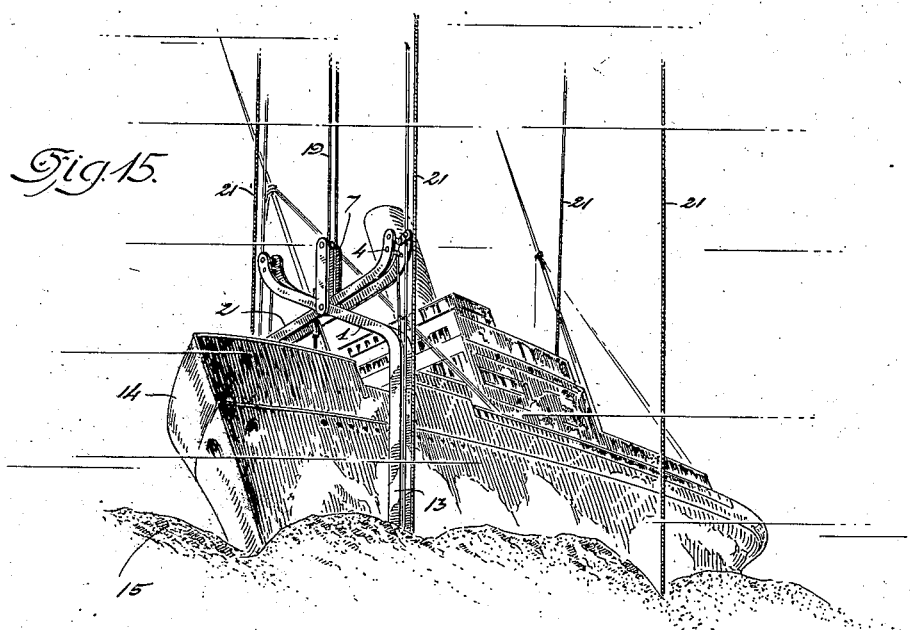
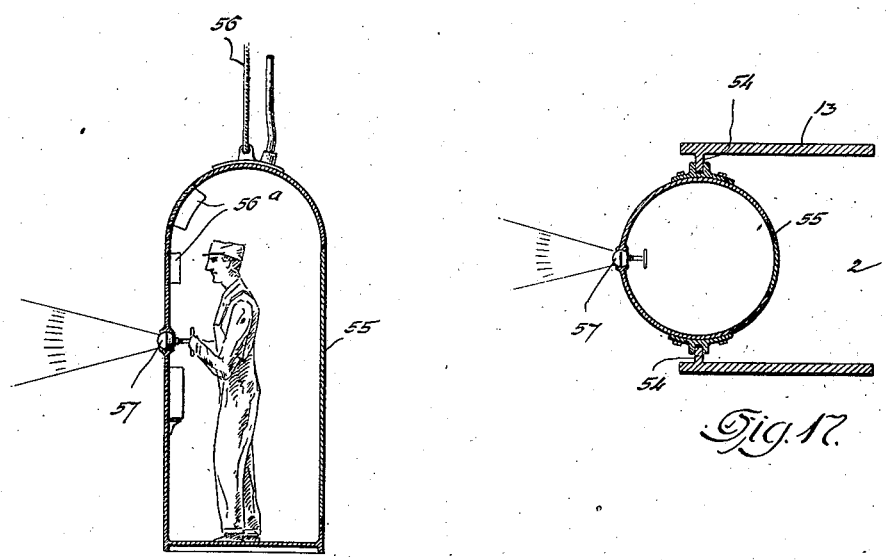
Inventor:
William J. Buell Patented Feb. 1, 1927.

1,616,410

UNITED STATES PATENT OFFICE.

WILLIAM J. BUELL, OF ECORSE, MICHIGAN.

CABLE-THREADING APPARATUS.

Application filed October 11, 1926. Serial No. 140,718.

This invention relates to a cable threading or placing apparatus adapted to be used in the salvaging or recovering of vessels that may have been sunken; wreckage that may have been lost at sea, cargoes and other material or saving, the device being designed to place cables under or to submerge vessels or material and particularly those that may have settled into sand, mud or other matter generally found on the bottom of a river, lake or sea.

My invention aims to provide an apparatus that may be manipulated from pontoons, salvaging vessels and the like for threading the ends of hoisting cables under a vessel and connecting the cables, so that a suitable hoisting engines may be employed for raising and recovering the vessel. The apparatus may be characterized in the following particulars.

First, there are novel needle like members adapted to be forced through subterranean matter, as sand or mud, and fluid under pressure is also utilized for preventing the needle like members from becoming clogged with mud or other foreign matter that might interfere with the connection of the cables.

Second, the apparatus includes a large tong or scissor-like framework that may be manipulated by cables or flexible members to place the framework about a vessel so that hoisting cables carried by the framework will be brought together and connected under the vessel to be used in righting or raising the vessel, after the framework is removed.

Third, the apparatus is further characterized by the framework including workmanized stations which will permit of subterranean conditions being observed and work directed, and sounding devices in connection with an amplified telephone system by the location of wreckage and its kind may be determined as the apparatus is placed in position preparatory to connecting hoisting cables.

The apparatus will be hereinafter specifically described and then claimed, and reference will now be had to the drawings wherein—

Figure 1 is an end view of the apparatus relative to a sunken vessel, showing the needle like members approaching each other preparatory to connecting cables carried by said members;

Fig. 2 is a bottom plan of one of the needle members;

Fig. 3 is a similar view of the other needle member;

Fig. 4 is a view similar to Fig. 1, showing the needle members in adjoining relation;

Fig. 5 is an edge view of the framework of the apparatus;

Fig. 6 is a longitudinal sectional view of adjoining needle members showing the coupling of cables;

Fig. 7 is a bottom plan of the same;

Fig. 15 is a perspective view of the apparatus as it may appear in connection with a sunken vessel;

Fig. 16 is a vertical sectional view of an observation station adapted to form part of the apparatus, and Fig. 17 is a horizontal sectional view of the same.

Figure 8:
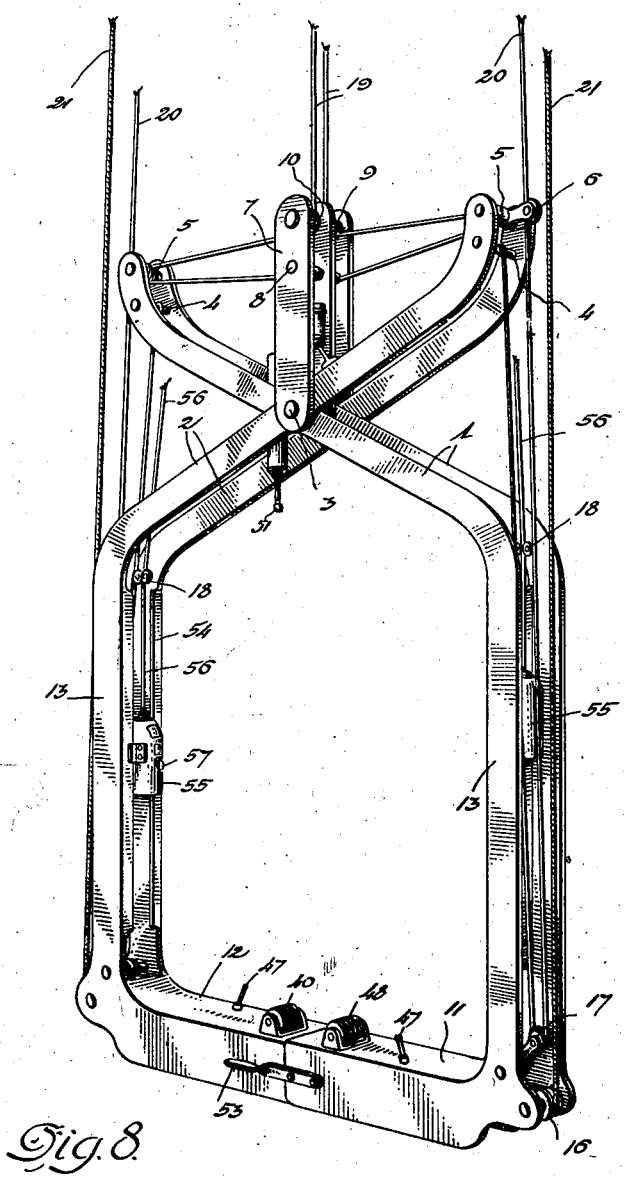
Fig. 8 is a perspective view of the apparatus in a closed position.
Figure 9:
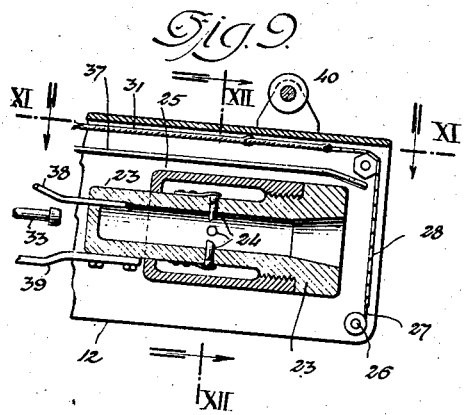
Fig. 9 is a longitudinal sectional view of a cable socket member and a portion of a needle member.
Figure 10:
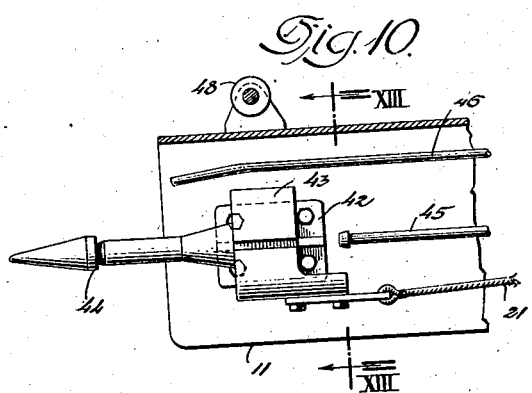
Fig. 10 is a longitudinal sectional view of a portion of another needle member showing a cable pin member.
Figure 11:
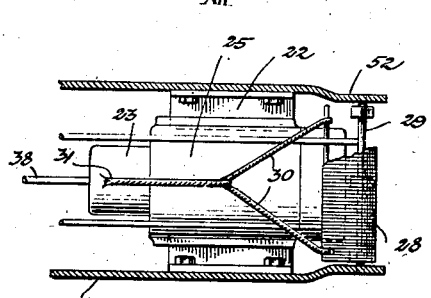
Fig. 11 is a horizontal sectional view taken on the line XI—XI of Fig. 9.
Figure 12:
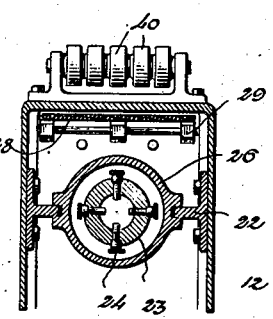
Fig. 12 is a cross sectional view taken on the line XII—XII of Fig. 9.
Figure 13:
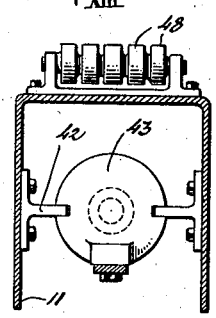
Fig. 13 is a similar view taken on the line XIII—XIII of Fig. 10.

The apparatus comprises a tong or scissor-like framework composed of channel members 1 and 2 which intersect or cross each other, and are pivotally connected together by a pivot pin 3. The upper ends of the members 1 and 2 are curved and each member provided with anchoring pins 4, sheaves 5 and 6.

The pivot pin 3 is provided with a large shackle 7 having an anchoring pin 8 and sheaves 9 and 10.

The lower ends of the members 1 and 2 terminate in inwardly projecting complemental needle members 11 and 12 respectively and these needle members are preferably disposed at a right angle to leg portions 13 of the members 1 and 2, said leg portions being of sufficient length to permit of the framework embracing a large vessel 14, which is shown as an example of submerged material that may be recovered after having been sunken and possibly settled in a sand or mud bottom 15.

In each of the members 1 and 2, at the lower ends of the leg portions 13 are cable rollers 16 and sheaves 17. At the upper ends of the leg portions 13 are guide rollers 18 and a number of other flexible members are used in connection with the framework for manipulating the members 1 and 2 somewhat similar to a pair of tongs.

There are closing cables 19 trained under the shackle sheaves 9 and about the sheaves 5 and attached to the anchoring pin 8 of the shackle. By pulling on these cables 19 the upper ends of the members 1 and 2 may be drawn towards each other to shift the needle members 11 and 12 towards each other to a closed adjoining position, as shown in Figs. 4 and 8.

Opening cables 20 engage the sheaves 6 and extend downwardly in the leg portions 13 against some of the guide rollers 18 and attached to the anchoring pins 4. By pulling on the upper ends of the opening cables 20 the needle members 11 and 12 may be shifted away from each other to an open position, and it is obvious that the closing cables 19 must be slackened to permit of its being done.

In addition to the cables 19 and 20 there are main hoisting cables or flexible members 21 which extend downwardly at the outer sides of the leg portions 13 of the members 1 and 2 and under the rollers 14 with the ends of said main hoisting cables extending into the needle members 11 and 12 and adapted to be coupled therein by a novel pin and socket coupling mechanism that will now be described.

In the outer end of the needle member 12 are brackets 22 slidably supporting a socket member 23 having a plurality of spring pressed snap fasteners or keepers 24. A detachable housing 25 is mounted on the socket member 23 to prevent mud or other foreign matter from interfering with the operation of the socket member and it is this housing that slidably supports the socket member 23 relative to the brackets 22.

In the extreme outer end of the needle member is a conventional form of spring actuated roller 26 and attached thereto and normally wound on said roller is a cable or flexible member 27 attached to a flexible mold guard or curtain 28 trained over a guide roller 29 and provided with a bell 30 to which is connected a cable 31. The cable 31 is trained under a guide roller 32 at the lower end of the leg portion 13 of the member 2 and extends upwardly to be manipulated, at a predetermined time either from above the surface of the water or from an observer's station forming part of the apparatus. The mud guard 28 forms a curtain at the outer end of the needle member 12 to prevent mud and other foreign material from entering the end of the needle member and just before the needle members 11 and 12 are brought into adjoining relation the mud guard is shifted out of the way.

The socket member 23 is adapted to be projected forwardly to a coupling position by a fluid pressure actuated arm 33 supported by brackets 34 in the needle member 12. Fluid under pressure may be supplied to the cylinder 35 of the arm by a conduit 36 that extends upwardly in the member 2 and upwardly along the shackle 7 and the closing cables 13 to the salvaging vessel which manipulates the apparatus relative to the sunken vessel 14. Along with the conduit 36 are other conduits, one of which is designated 37 and it extends to the outer end of the needle member 12 and has a branch 38 communicating with the socket member 23.

Fluid under pressure from the conduit 37 is adapted to prevent mud and other foreign matter from entering the socket member 23 and the needle member 12 and the escaping fluid is adapted to pave or clear away in the sand or mud bottom 15 so that the needle members 11 and 12 may be opened or closed, particularly the former, and it is by using air, liquid or other motive fluid that the manipulation of the needle members is made easy in a sand or mud bottom into which may settle the vessel 14.

The socket member 23 is provided with a connecting member 39 for the end of one of the hoisting cables 21, and the needle member 12 is provided with vessel engaging roller bearings 40 and a sounding device 41.

In the needle member 11 are brackets 42 slidably supporting a pin member 43 having a headed pin 44 adapted to enter the socket member 23 and be held by the keepers or fasteners 24. The pin member 43 is adapted to be shifted to a coupled position by an arm 45 similar to the arm 33 of the needle member 12. The other main hoisting cable 21 is connected to the pin member 43 and in the needle member 11 is a fluid discharge conduit 46 similar to the conduit 37 and a sounding device 47 similar to the sounding device 41. The needle member 11 also has roller bearings 48 adapted to cooperate with the roller bearings 40 in engaging the hull of the vessel 14, as shown in Fig. 4. The sounding devices 41 and 47 are adapted to engage the hull of the vessel 14 in advance of the roller bearings 40 and 48 and indicate to an observer or operator of the apparatus that the needle members 11 and 12 are approaching an active adjoining position under the vessel. These sounding devices are of a conventional form used by divers to determine the nature of the material contacting with said devices, and said devices form part of a telephone system having leading-out conductors 49 that may extend up along the members 1 and 2 and the shackle 7. In the shackle may be a junction or outlet box 50 and another sound device 51 may be supported by either of the members 1 or 2, adjacent the shackle 17, so that said devices may determine the location of the upper portion of the vessel.

The outer end of the needle member 12 is somewhat contracted, as at 52 so as to enter the outer end of the needle member 11, as best shown in Figs. 6 and 7, and to facilitate such adjoining relation the needle member 11 has guide arms 53.

In the leg portions 13 of the members 1 and 2 are longitudinal guides 54 for observation stations or elevators 55 adapted to hold one or more workman or observers, each station being in the form of a water proof enclosure suspended from a hoisting cable 56 engaging one of the guide rollers 18 and extending upwardly above the surface of the water so that the observation station may be raised and lowered above the mud bottom 15. Each station has glass protected side openings 56ª, a searchlight 57 and such other equipment that will permit of an observer directing workers on the salvaging vessel in the manipulation of the apparatus relative to the vessel 14.

Figure 14:
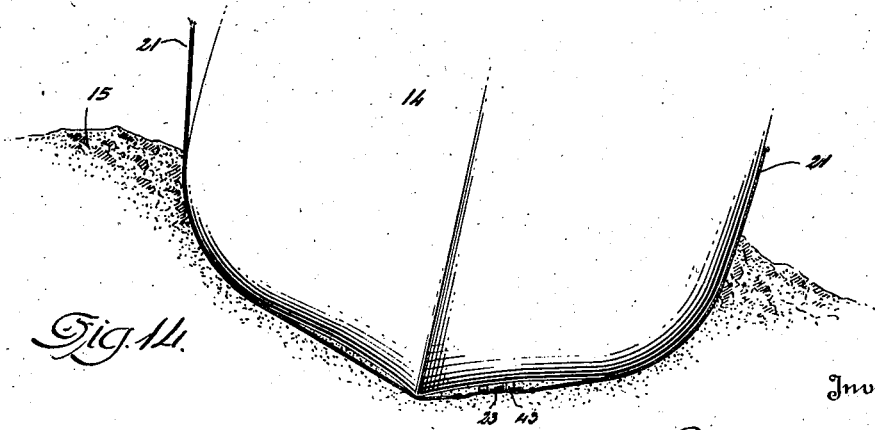
Fig. 14 is an end view of a portion of a vessel showing coupled cables under the vessel.

After the needle members 11 and 12 are closed and a coupled relation established between the socket member 23 and the pin member 43, the needle members 11 and 12 are separated, the socket and pin members sliding off of the brackets 22 and 42. Withdrawal of the needle members 11 and 12 leaves the cables 21 connected beneath the hull of the vessel 14, as shown in Fig. 14 and with slack of the hoisting cables 21 the apparatus can be opened and removed from about the vessel, so that the hoisting cables 21 can be pulled to raise the vessel 14. In some instances the apparatus may be kept in proximity to the main hoisting cables 21 to assist in guiding a piece of wreckage to the surface of the water, and after one set of hoisting cables has been located the apparatus may be used to place other hoisting cables whereby sunken matter may be safely recovered.

It is thought that the operation and utility of my apparatus will be apparent without further description, and while in the drawings there is illustrated a preferred embodiment of my invention, it is to be understood that the structural elements are susceptible to such variations and modification as fall within the scope of the appended claims.

What I claim is:—

1. A cable threading apparatus adapted to place the ends of hoisting cables under submerged matter and connect the submerged cable ends to permit of said hoisting cables being used to raise the submerged matter, said apparatus comprising a tong-like framework adapted to be opened and closed and place the cable ends under the submerged matter, means to facilitate opening and closing said framework, and cable coupling means carried by said framework.

2. A cable threading apparatus as called for in claim 1, wherein said cable coupling means includes a socket member and a pin member to which the cable ends are attached.

3. A cable threading apparatus as called for in claim 1, wherein said cable coupling means includes interlocking members adapted to be projected towards each other, and means for projecting said members.

4. A cable threading apparatus as called for in claim 1, wherein said cable coupling means includes slidable socket and pin members, and rams adapted to slide said socket and pin members towards each other.

5. A cable threading apparatus as called for in claim 1, wherein said tong-like framework includes needle members in opposed relation and inclosing said cable coupling means.

6. A cable threading apparatus as called for in claim 1, and observation elevators carried by said tong-like framework.

7. A cable threading apparatus as called for in claim 1, and fluid pressure means carried by said framework and adapted to force foreign matter away from the lower end of said framework.

8. A cable threading apparatus adapted to place the ends of hoisting cables under submerged matter and connect the submerged cable ends to permit of said hoisting cables being used to raise the submerged matter, said apparatus comprising pivotally connected members of tong-like formation, a shackle carried by the pivot of said members and adapted for raising and lowering said members, opening and closing cables articulated with said members for opening and closing said members relative to each other, hoisting cables arranged relative to said pivotally connected members to be submerged therewith, and cable coupling means carried by said pivotally connected members adapted to couple the submerged cable ends.

9. A cable threading apparatus as called for in claim 8, and needle members carried by said pivotally connected members and inclosing said cable coupling means.

10. A cable threading apparatus as called for in claim 8, wherein said cable coupling means includes pin and socket members to which the cable ends are attached, said members being releasable relative to said pivotally connected members whereby said connected cable ends may be left in engagement with the submerged matter after said pivotally connected members are removed.

11. A cable threading apparatus adapted to place the ends of hoisting cables under submerged matter and connect the submerged cable ends to permit of said hoisting cables being used to raise the submerged matter, said apparatus comprising pivotally connected members, needle members carried thereby and adapted to be moved to and from each other beneath submerged matter, means connected to said pivotally connected members for shifting said needle members, hoisting cables arranged relative to said pivotally connected members, and cable coupling means carried by said needle members and adapted to couple the ends of said hoisting cables so that said pivotally connected members may be removed.

12. A cable threading apparatus as called for in claim 11, wherein the first mentioned means includes opening and closing cables arranged on said pivotally connected members so that said members may be opened and closed to shift said needle members.

13. A cable threading apparatus as called for in claim 11, and fluid pressure means in said needle members adapted to force foreign matter away from the cable coupling means therein.

14. A cable threading apparatus as called for in claim 11, and fluid pressure means adapted to shift said cable coupling means to release it relative to said needle members.

15. A cable threading apparatus as called for in claim 11, and a mud-guard carried by one of said needle members.

16. A cable threading apparatus as called for in claim 11, and an observation station carried by one of said pivotally connected members.

17. A cable threading apparatus adapted to place the ends of hoisting cables under submerged matter and connect the submerged cable ends to permit of said hoisting cables being used to raise the submerged matter, said apparatus including carrying means for said hoisting cables, cable coupling means carried by said carrying means, and means adapted to release said cable coupling means relative to said carrying means so that said carrying means may be removed to leave the coupled hoisting cables in engagement with the submerged matter.

18. A cable threading apparatus as called for in claim 17, wherein the last mentioned means is fluid pressure actuated and supported from said carrying means.

19. A cable threading apparatus as called for in claim 17, wherein said cable coupling means includes automatic interlocking members adapted to be brought into engagement with each other by said carrying means.

20. A cable threading apparatus as called for in claim 17, wherein said carrying means is in the form of a framework adapted to be lowered over the submerged matter to embrace the matter and place said hoisting cables in position for raising the submerged matter.

21. A salvaging apparatus comprising tong-like pivotally connected members adapted to be opened and closed and adapted to be lowered over submerged matter and closed to embrace the submerged matter, opening and closing cables carried by said members and adapted for opening and closing said members, and fluid pressure means supported by said members and adapted to force foreign matter away from said members.

22. A salvaging apparatus as called for in claim 21, and an observation station carried by one of said members and adapted to be submerged therewith.

23. A salvaging apparatus as called for in claim 21, and sounding devices carried by said members and adapted to indicate the position of said members relative to submerged matter.

In testimony whereof I affix my signature.

WILLIAM J. BUELL.